United States Patent [19]

Urbanus

[11] Patent Number: 5,255,100
[45] Date of Patent: Oct. 19, 1993

[54] DATA FORMATTER WITH ORTHOGONAL INPUT/OUTPUT AND SPATIAL REORDERING

[75] Inventor: Paul M. Urbanus, Dallas, Tex.

[73] Assignee: Texas Instruments Incorporated, Dallas, Tex.

[21] Appl. No.: 755,981

[22] Filed: Sep. 6, 1991

[51] Int. Cl.$^5$ ............................................... H04N 5/74
[52] U.S. Cl. ..................................... 358/231; 358/236; 358/160
[58] Field of Search ............... 358/140, 141, 241, 236, 358/233, 231, 160, 60, 62

[56] References Cited

U.S. PATENT DOCUMENTS

| | | | |
|---|---|---|---|
| 4,210,934 | 7/1980 | Kutaragi | 358/241 |
| 4,775,891 | 10/1988 | Aoki | 358/160 |
| 4,811,099 | 3/1989 | Hedley et al. | 358/160 |
| 4,901,155 | 2/1990 | Hara et al. | 358/231 X |
| 4,956,619 | 9/1990 | Hornbeck | 358/231 X |

*Primary Examiner*—Victor R. Kostak
*Attorney, Agent, or Firm*—Julie L. Reed; James C. Kesterson; Richard L. Donaldson

[57] ABSTRACT

A method and structure for reformatting digitized standard video data for input into a binary spatial light modulator. The data enters circuitry that separates all of the equally weighted binary data into line segments, which are then stored. The data is then read out of the memory in such a manner that the proper digital samples correspond to the proper rows and columns of the spatial light modulator.

11 Claims, 7 Drawing Sheets

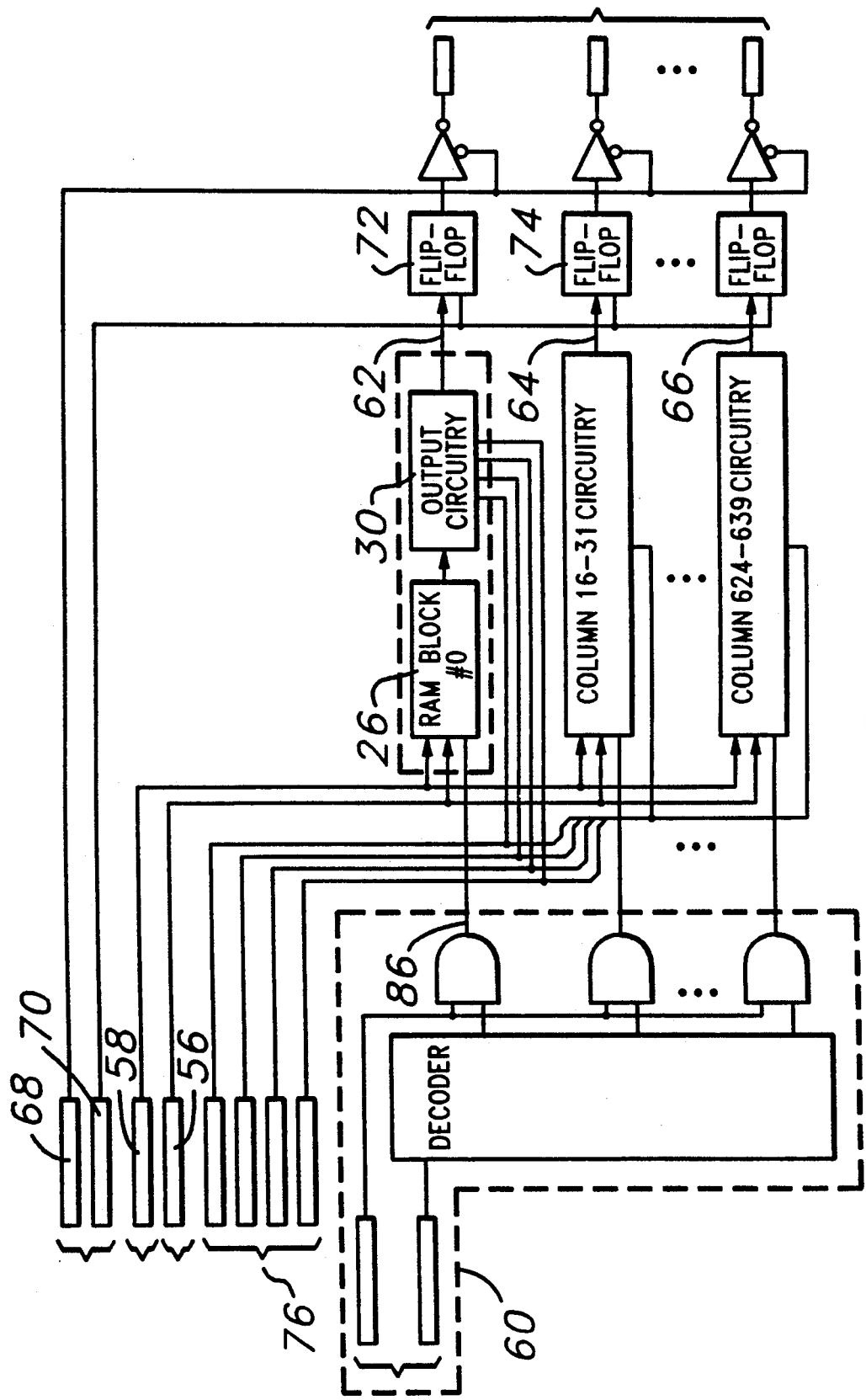

DATA FORMATTER WITH ORTHOGONAL INPUT/OUTPUT AND SPATIAL REORDERING

This application is related to U.S. patent application Ser. No. 678,761, filed Apr. 2, 1991, and copending applications U.S. Ser. No. 756,007, U.S. Ser. No. 755,883 and U.S. Ser. No. 756,026.

1. FIELD OF THE INVENTION

This invention deals with data reformatting, more specifically, data reformatting of a digital video data stream from a rasterized format into a format compatible with binary spatial light modulator video systems.

2. BACKGROUND OF THE INVENTION

The use of spatial light modulators in projection systems offers many advantages over the standard cathode ray tube projection systems. This can be seen especially clearly in the television industry.

One of the many controversies in the television industry relating to high-definition television (HDTV) is the question of a standard format. Some companies have proposed systems that are different from the current television standard (NTSC). Systems using spatial light modulators can utilize any standard, as long as the format of the incoming signal is known, and is capable of being digitized into some known digital data pattern.

Once the data is digitized, there are still many problems to be solved in order to pass the data onto a binary spatial light modulator, one that has cells that can be turned on ("1") or off ("0"). In standard video signals, the data is sent down the wire one pixel at a time. All the data for a given pixel is sent at the same time. The temporal order of the data is sent such that this temporal order corresponds to the spatial order of the pixels within the image line. The data for binary spatial light modulators is normally loaded into the modulator in a highly parallel fashion. Only a portion, usually one bit, of the data for the given pixel is sent to the modulator at a time. This is required for the technique used to generate gray-scale images with a binary device using pulse width modulation. The data loaded into the modulator may not be spatially contiguous. The temporal-to-spatial ordering relationship does not necessarily exist for a given line of the image.

Therefore, it is an object of the present invention to provide methods and apparatus to reformat the digitized video stream into a format that will optimize the use of the binary spatial light modulator in a projection system used in televisions, or computer monitors, or any other video system.

SUMMARY OF THE INVENTION

Objects and advantages will be obvious, and will in part appear hereinafter and will be accomplished by the present invention which provides a reformatter for the display of visual data. The structure contains circuitry which converts a serial digitized video stream of data into a parallel video data stream to be used in conjunction with a binary spatial light modulator. The data is broken apart from a temporal format that corresponds to a spatial ordering for any given image line. It is then reordered to be fed onto the spatial light modulator in a parallel fashion where the data being loaded at the same time is not spatially contiguous.

It is an advantage of the invention that is can use any standardized video format, such as NTSC, VGA or PAL. It is a further advantage of the invention that it makes maximal use of spatial light modulators in a video display to achieve high definition projection in televisions, computer monitors and other video systems.

BRIEF DESCRIPTION OF THE DRAWINGS

For a complete understanding of the invention, and the advantages thereof, reference is now made to the following description in conjunction with the accompanying drawings, in which:

FIG. 4 shows an example of circuitry for reformatting digitized video signals.

DETAILED DESCRIPTION OF THE PREFERRED EMBODIMENTS

Binary spatial light modulators operate in an ON/OFF fashion. One example of such a modulator is the deformable mirror device (DMD). At least three architectures are currently used in fabricating DMDs. These include the torsion beam, the cantilever beam, and the flexure beam. In one embodiment of this invention, the torsion beam DMD is used. Any binary spatial light modulator could be used, but for purposes of discussion, the focus will be on the torsion beam DMD.

Torsion beam DMDs consist of a reflective surface supported over an air gap by a diagonal hinge which is in turn supported by two posts. Electrodes to either side of the diagonal hinge lie in the air gap. When either electrode is addressed by applying a voltage, the electrostatic force attracts that portion of the surface that is on the same side of the hinge as the electrode. This causes the surface to turn about the hinge axis. In an optical system the DMDs are configured as an area array of pixels, wherein the pixels that are to be ON consist of surfaces turned to one side of the hinge axis, and those that are OFF can either be turned away from the ON direction or left unaddressed. Details of such a device can be found in a patent by Dr. Larry Hornbeck, U.S. Pat. No. 4,956,619 which is incorporated by reference herein.

The addressing of such devices brings up the problems previously discussed. Data must be reformatted from a standard video signal that has been digitized in order for it to be optimally utilized by the DMD. Thus the need for orthogonal input and output data to drive the DMD. Additionally, only data of the same binary weight can be displayed on the DMD at any given time. The binary weight is equal to the $2^n$ bit number. For example, in a 12-bit system, the least significant bit (LSB) is bit 0 and has a binary weight of $2^0 = 1$, while the most significant bit (MSB) is bit 11 and has a binary weight of $2^{11} = 2048$.

Figure 1:
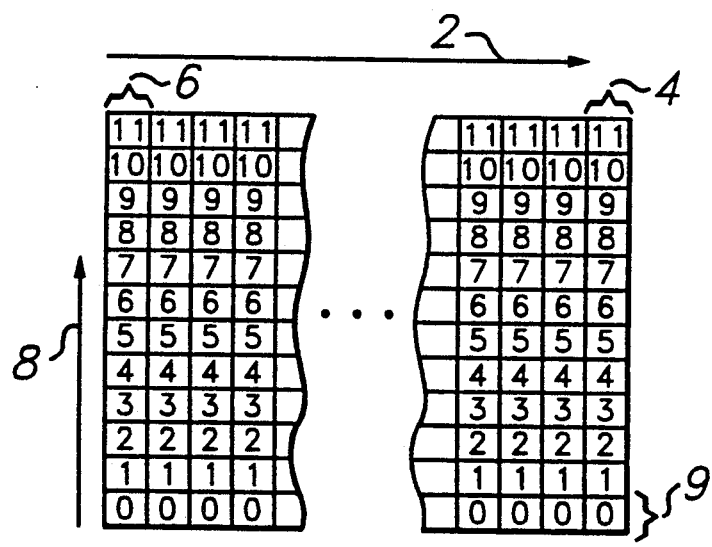
FIG. 1 shows orthogonal data input and output.

An example of the orthogonality of the input and output is shown in FIG. 1. The vertical columns of data represent the 12-bit data samples taken. The grid fills in the direction of arrow 2, where the column 4 represents the first sample, and column 6 represents the 640th sample. The grid is emptied row by row in the direction of column 8. Row 9 represents the row filled with all data that is binary weight 0, or bit 0, for the first line of video data.

Figure 2:
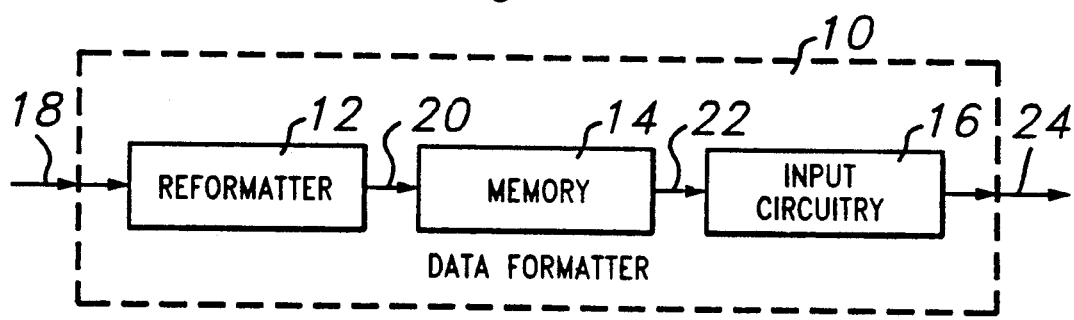
FIG. 2 shows a block diagram of the reformatter.

One embodiment of the invention is shown in FIG. 2. The data formatter 10, consists of reformatter circuitry 12, a frame memory 14, and input circuitry for the DMD 16. The digitized video data enters the formatter through line 18, into the reformatter circuitry 12. The reformatter then passes the data into a frame memory buffer circuit 14 through path 20. The interconnects between blocks of circuitry is shown here to be a single line. It is assumed that any data transmission scheme could be used, such as multiplexing, parallel data buses, etc. When the data is required by the DMD, it is then passed from the memory 14 to the input circuitry of the DMD 16 through path 22. The input circuitry then passes the data into the electrodes of the DMD, shown as path 24.

Figure 3A:
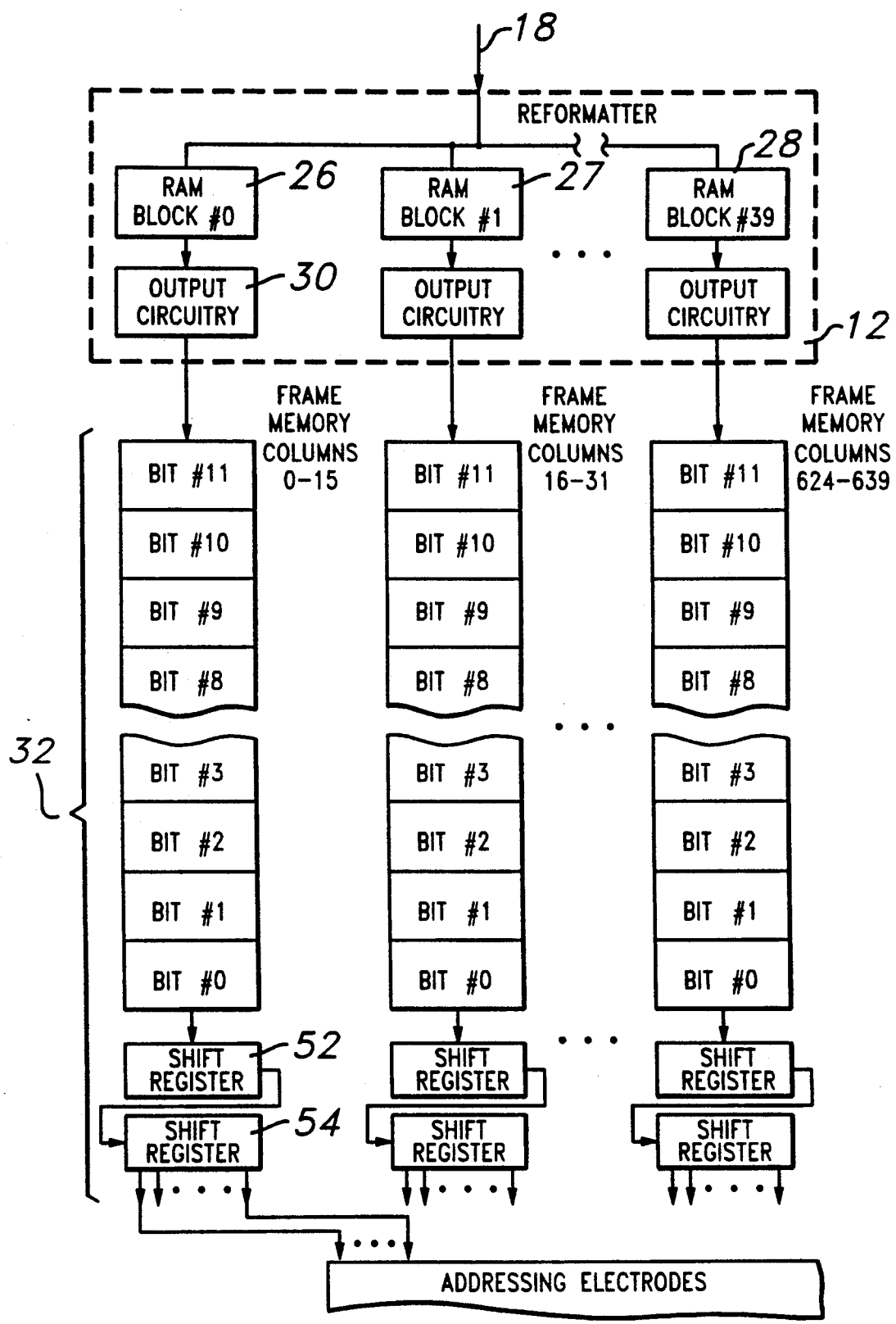
FIGS. 3A-3D show block diagrams for the data flow.

FIG. 3A shows a block diagram for the flow of the data from the video signal through the reformatter, through memory, to the input of the DMD array. The data enters the reformatter 12 through line 18. In this example, the data is 12 bits wide. The data is placed in a random access memory (RAM), such as 26, which is RAM block #0. Not shown are the control signals that decide which of the RAMs is to be accessed, and what address within the RAM is to be written to, and the write control signal, which causes the data to be stored in the RAM. In this embodiment, the RAM is 16×12, that is, it can hold 16 12-bit words. Each line of input video consists of 640 12-bit data samples. Since each RAM block holds 16 samples there are 40 RAM blocks to hold a complete video line. After RAM 26 (RAM block #0) has been filled with the first sixteen data samples (samples 0-15), the addressing circuitry designates the next RAM, 27, to hold the next 16 samples (samples 16-31). This continues until RAM 28 (RAM block #39) has been filled with the last sixteen samples (samples 624-639). At this point the RAM blocks contain all of the 640 samples for video line 0. There are a total of 480 lines in this example, lines 0-479. The data must then be read out of the RAMS in 12 and stored in a frame memory before another line of data can be received into 12.

Figure 3B:
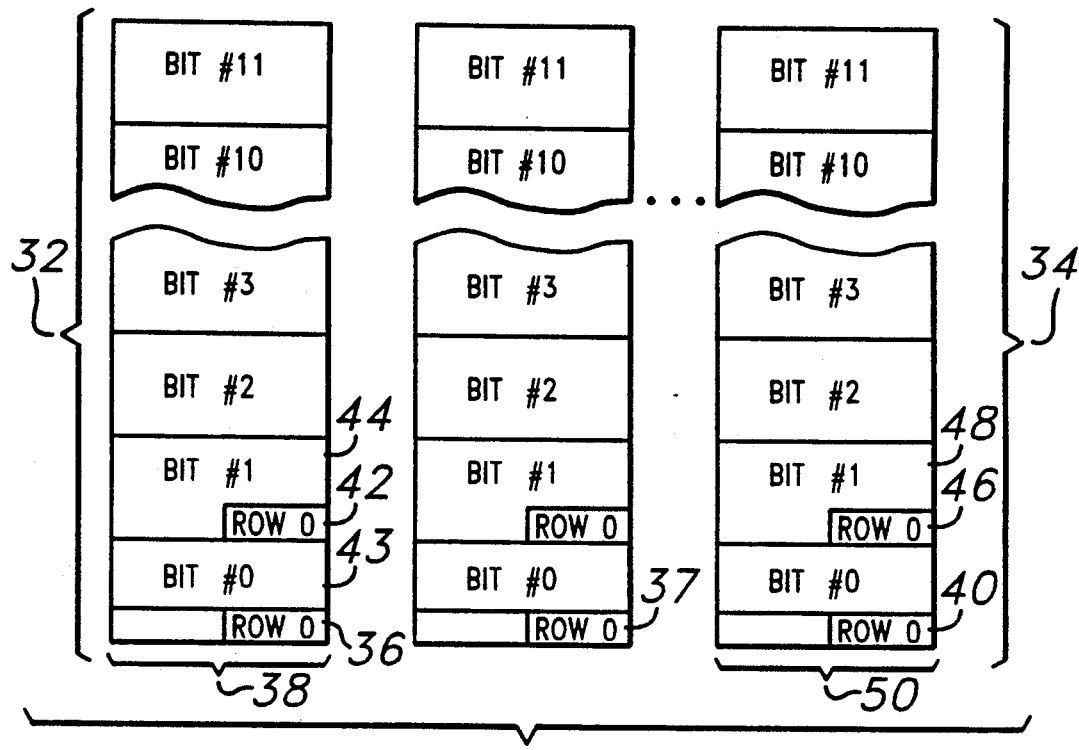

Block 30 contains circuitry, such as decoders or multiplexers, which output the data one bit at a time from the RAM 26 to the frame memory 32. A more complete understanding of the organization of the frame memory can be achieved by referring to FIG. 3B. Memory 32 is the frame memory allocated for DMD columns 0-15. Memory 34 is the frame memory allocated for DMD columns 624-639. Each memory stack contains data for 16 spatially contiguous DMD columns. Thus, the relative organization of each memory is the same, the only difference is in which columns are stored. If video sample 0 for line 0 corresponds to the very upper left hand corner of the television screen, this must become the data for row 0, columns 0-15, on the DMD array. The memory is random access, so the data can be stored in the memory using any scheme or order the designer imagines, as long as the data comes out in the correct order when it is sent to the DMD. As mentioned above, the order is different if the data must be flipped with respect to left-right, or top-bottom, or both.

Figure 3C:
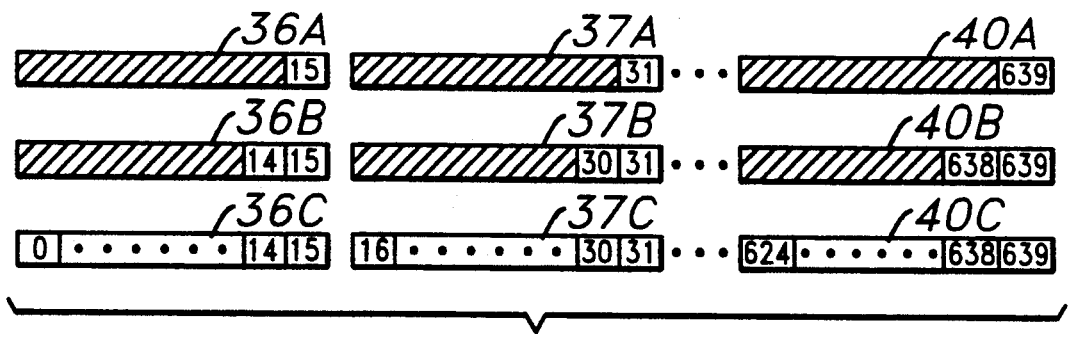

Conceptually, it is simpler to state that the data for row 0, columns 0-15, bit 0, is stored in the area of the memory designated by numeral 36. The area 38 including box 36 is reserved for rows 0-15, columns 0-15, bit 0. The 12-bit data for columns 0-15 (the first sixteen samples of data received) was read into the RAM. The data is brought out of the RAM by bit number in parallel with the other RAMs. Therefore, box 36 is being filled as shown in FIG. 3C. The first bit 0 is from sample 15. It is placed in the far right hand of box 36A. Simultaneously, bit 0 from sample 31 is placed in box 37A. This process is duplicated in all 40 blocks, as can be seen in box 40A, for bit 0, sample 639. Then bit 0 sample 14 is placed next to it, as shown in 36B. Simultaneously, sample 30, bit 0, is placed next to sample 31, bit 0, shown in box 37B. This operation is duplicated to all 40 blocks, up to sample 638, shown in box 40B. This continues until the whole bit 0 word for row 0, columns 0-15 is loaded in box 36C, and the bit 0 word for row 0, column 16-31 is simultaneously loaded in box 37C, etc.

Figure 3D:
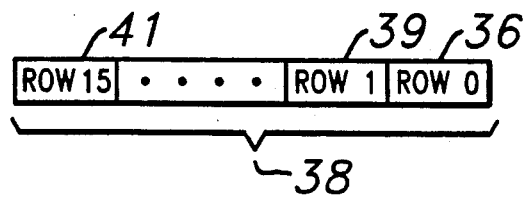

The data that would be placed at the far right of box 38, bit 0 data for row 1, columns 0-15, is not yet available, since the rows of the DMD array corresponds to the video data lines, and the RAMs in block 12 contain the data for row 0. The next data to come out of the RAMs in parallel is bit 1 for the respective columns. This data is written in the lower right hand corner 42, of the space allocated for bit 1 data, 44. Again, simultaneously, the data for columns 624-639, bit 1, is being loaded into area 46 of the space designated for those columns' bit 1 data 48. This continues as the data is read out by bit number from the RAMs. After the data for line 0 is stored, the incoming data for line 1 is stored in the RAMs in the same manner as for the line 0 data. Then, the data for line 1 is loaded from the RAM to the memory. Now the area of space 38, which includes space 36, contains the data for row 1, columns 0-15, bit 0. Simultaneously, the data for columns 624-639, row 1, bit 0 is loaded into space 50. The areas designated by 38 and 50 are capable of storing the data for 16 rows, or a total of 256 bits. An exploded view of area 38 is shown in FIG. 3D. Data for line 0, columns 0-15, bit 0 is placed in area 36 shown in FIG. 3C. After the rest of the line 0 data is stored, the data for line 1, bit 0, columns 0-15 is stored in area 39. This continues until line 15, column 0-15, bit 0 is stored in area 41. Therefore, area 38 can hold all of the bit 0 data for columns 0-15, for video lines 0-15. Since the frame memory must feed 240 DMD lines and area 38 holds 16 DMD lines, block 43 must then be comprised of 15 such lines. This allows the memory to hold enough data for 240 rows of mirrors. This circuity is duplicated at the bottom of the mirror array for the lower 240 rows of mirrors.

Referring again to FIG. 3A, the data is output in parallel from the memory into a shift register 52. The shift register 52 is 256 bit wide 16 columns for 16 rows of data. The data is then shifted out of the 256-bit shift register 52 into a 16-bit shift register 54, one bit at a time. The first bit out of the shift register is the bit 0 for column 15, row 0. This bit is loaded into the first bit of register 54 on the left-hand side. When the next clock cycle occurs, the bit 0 for column 14, row 0 is shifted out of shift register 52 and into the left hand side of shift register 54. The bit 0 for column 15, row 0, shifts one position to the right. This continues until the shift register 54 contains all of the bit 0 data for columns 0-15, row 0. The register 54 is then emptied in parallel into the addressing electrodes for row 0, columns 0-15.

The next word to be shifted out of the shift register 52 is bit 0 for row 1, columns 0-15. This continues for all of the data for bit 0, lines 0–239. This is occurring simultaneously at the registers for the other stacks of data. Eventually, every row and column of the entire array of mirrors is loaded with their respective bit 0 data. The mirrors are signalled to accept the data that has been loaded, and they turn on or stay off, as the data designates. The mirrors stay on as long as necessary according to the pulse-width modulation scheme discussed in the related application, U.S. Ser. No. 678,761. This continues for each of the bit numbers for however many bits of resolution used. In this example, twelve bits were used.

In this scheme, no incoming data can be loaded into the RAMs until the old data has been read out and stored in the frame buffers. This limits the speed of the system. It is possible to speed this process up in many ways. The processing scheme shown in block 12 FIG. 3A could be duplicated to take advantage of the ping-pong effect. The only dimensions that are critical, are the sizes of the shift registers going into the DMD, and the number of words in the RAM, which must match. In this example, 16-bit shift registers were used, and the RAM could hold 16 words.

An example of actual circuitry to implement this scheme is shown in FIG. 4. In this diagram, the RAM from FIG. 3A, 26 is shown with the multiplexing circuitry 30 in a dashed box. A detailed description of one possibility for implementing this function is discussed in FIG. 5. The data is brought to the RAM 26 on 12-bit line 56. The 4-bit line 58 selects which of 16 locations in the RAM the data will be written into. The RAM selected to be written to is designated by the logic inside of box 60, which will be discussed further in FIG. 6.

After all of the data is loaded into all of the RAMs, the output cycle begins. Bit 0 for the fifteenth sample of each block is selected through the logic 30 and address bus 58 and placed on the output of the block on lines 62, 64, etc. Bit 0 for sample 639, of block #39, would be on line 66. When all of the data is ready, the output enable signal on line 68, and the output clock signal on line 70 allow the data to be passed through the D flip-flops 72, 74, etc. to the memory as discussed in FIG. 3A.

Figure 5:
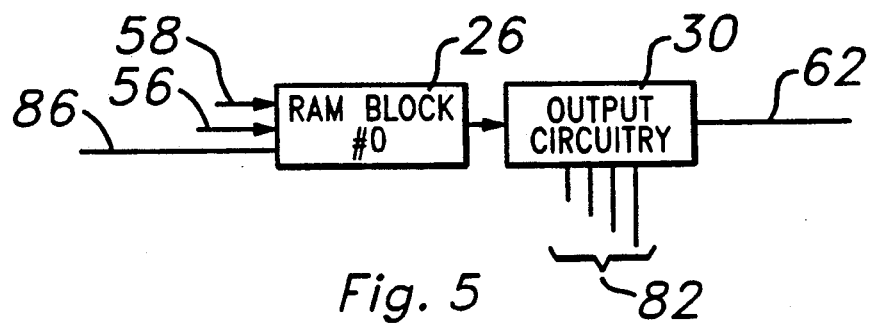
FIG. 5 shows a possible architecture for multiplexing data.
Figure 6:
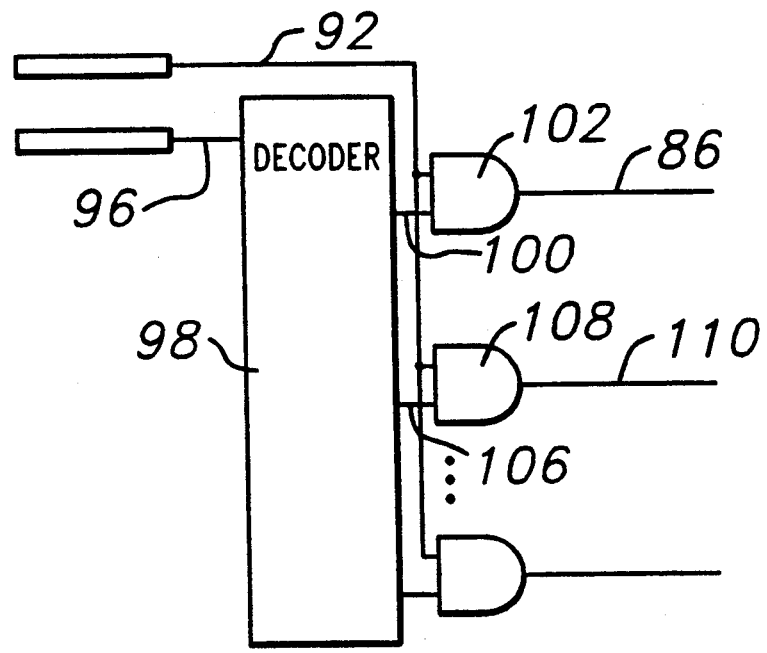
FIG. 6 shows an exploded view of a write enable scheme.

In order for this scheme to work, the data must be selected in the proper order from each RAM and placed into the output logic one bit at a time. As exploded view of one possible implementation is shown in FIG. 5. The data is presented to the RAM via data bus 56. The RAM location at which the data will be stored is selected via address bus 58. When the RAM has been filled, the write enable signal deactivated. At the appropriate time, after all of the RAM blocks have been filled, a 12-bit data sample is read out of the RAM location designated by the address bus 58, and passed to the 12:1 multiplexer 30. Bit designation lines 82 select the bit to be placed on line 62. In this example, the first sample selected out of the RAM would be sample 15, and the first bit multiplexed out of the sample would be bit 0.

As mentioned earlier, only one RAM at a time, is designated to be filled with data. This is accomplished by the logic of FIG. 6, which produces the write enable signal. The write enable signal is on line 92. The box 98 represents an $n:2^n$ decoder. Line 96 passes an n-bit data word that will select which of the output lines receives a high signal. If, for example, the high signal was to be on line 100, and the write enable signal 92 was also high, the AND gate 102 would produce a high write enable signal onto line 86. This would enable the first RAM block to be filled with data. After the RAM was filled, the signal on line 96 would select the output line 106 to be enabled, and the AND gate 108 would produce a write enable on line 110, to write to the next RAM. The process would be repeated to eventually have enabled all of the write enable lines of each RAM block.

Figure 7:
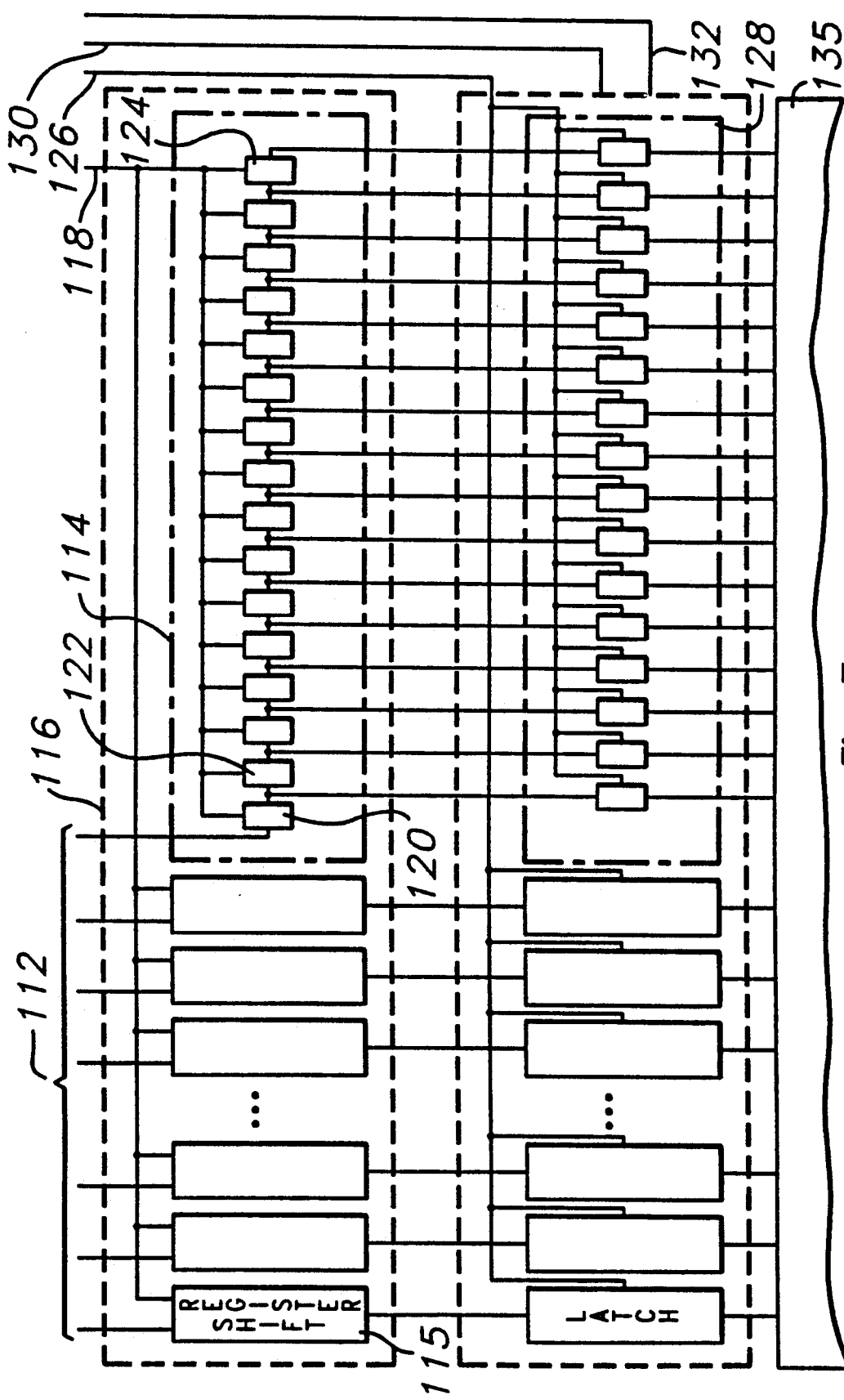
FIG. 7 shows an example of input circuitry for a DMD.

FIG. 7 shows an example of an implementation of the DMD input circuitry discussed in FIGS. 3A and 4. The input lines 112 represent each output of the 40 256-bit wide shift registers in the example used in FIG. 3A. An exploded view 114 of one of the 16-bit shift registers is shown for the last block, which in the example would be block #39. The data enters the bank of shift registers through line 116. The input clock is on line 118. When the 118 is pulsed, the initial bit enters register 120. When the clock is pulsed again, the data is shifted right to the next shift register 122, and the second bit of data enters shift register 120. This continues until shift register 124 is loaded. Line 126 is the load clock for the parallel latches connected to the shift registers in bank 128. Lines 130 and 132 are the clear and preset signals for bank 128. After the shift register bank has been filled, the data from the shift register bank is loaded in parallel into the parallel latches bank 128. This process is done for each of the shift register banks. The data is entered on to the electrodes of the upper half of the DMD 135 through the latches 128.

Figure 8:
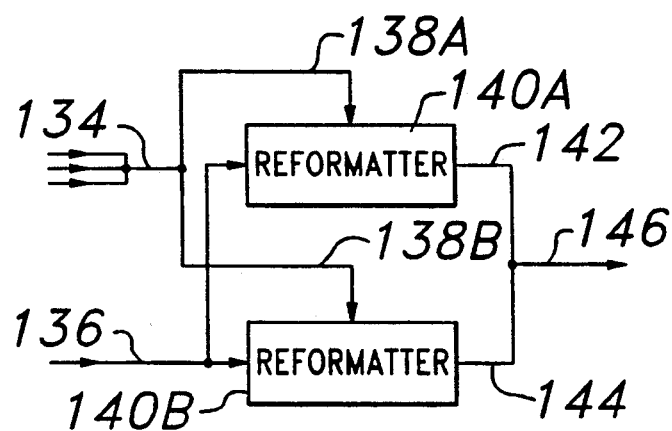
FIG. 8 shows an alternative implementation of overall data schemes.

Having established the detailed flow of the data through the reformatter module to the memory and into the input circuitry of the DMD, it is now possible to discuss some of the many alternatives for implementation. One such example is shown in FIG. 8. In the above example, 12 bits of resolution were used. If this were divided into three colors, the process is divided by bits of color, in addition to bit numbers. In actuality, the optimal system would probably be twenty-four bits of data, eight-bits for each color.

The three-color signal on bus 134 can be sent to either line 138A or 138B as designated by the system controller signal 136. If line 142 were actively reading out data from 140A, the input data would be passed to line 138B and block 140B would be filled. Blocks 140A and 140B are duplicates of block 12 from FIG. 3A. Line 146 is then the data output to the frame memory. This ping-pong effect allows a higher data rate. A multitude of such cascading arrangements are possible, limited only by the designer's imagination. Additionally, the circuitry could be duplicated for each color, to have one dedicated circuit for each color.

Thus, although there has been described to this point a particular embodiment for a method and structure for reformatting video data, it is not intended that such specific references be considered as limitations upon the scope of this invention except in-so-far as set forth in the following claims.

What is claimed is:

1. A method for displaying data from a standardized digital video signal comprising:
    a. holding digital samples in a buffer, wherein the width of said buffer corresponds to the width of one digital sample;
    b. reading said digital samples in words, wherein said words correspond to columns of said buffer;
    c. storing said words in a frame memory;
    d. transferring the contents of said frame memory to the inputs of a spatial light modulator array;
    e. controlling said array to display said data; and
    f. repeating steps a–e until said standardized video data stream is no longer available.

2. The method as claimed in claim 1 wherein said reading step further comprises reading the samples such that each word contains bits of the same binary weight.

3. The method as claimed in claim 1 wherein said storing step further comprises storing the words of the same binary weight for a set of columns of said spatial light modulator array so that the words of the same binary weight are spatially contiguous for each set of columns.

4. The method as claimed in claim 1 wherein said transferring step further comprises transferring the data into a serial shift register connected to said memory.

5. A system for displaying a standard digital video signal comprising:
 a. at least one buffer for holding digital samples, wherein said buffer's width is substantially equal to the length of one of said samples;
 b. readout circuitry for reading said samples from said buffers by words, wherein said words correspond to columns of said buffer and word length is substantially equal to the number of samples in said buffers;
 c. a frame memory for storing said words;
 d. a spatial light modulator array; and
 e. transfer circuitry for transferring said words from said frame memory to said spatial light modulator array.

6. The system as claimed in claim 5 wherein said buffer consists of a random access memory with a width equal to the width of said digital samples, and a depth equal to a factor of the total number of samples.

7. The system as claimed in claim 5 wherein said readout circuitry is operative to read from said buffers in parallel to create a word that has a width equal to the number of buffers, and each bit of said word is of equal binary weight.

8. The system as claimed in claim 5 wherein said spatial light modulator array further comprises an array of individually deflectable mirrors.

9. The system as claimed in claim 5 wherein said transfer circuitry further comprises a serial shift register.

10. A system for displaying a standard digital video signal comprising:
 a. at least one buffer for holding digital samples, wherein said buffer's width is substantially equal to the length of one of said samples;
 b. readout circuitry for reading said samples from said buffers by words, wherein said words correspond to columns of said buffer and word length is substantially equal to the number of samples in said buffers;
 c. a frame memory for storing said words;
 d. a data display; and
 e. transfer circuitry for transferring said words from said frame memory to said data display.

11. A method for displaying data from a standardized digital video signal comprising:
 a. holding digital samples in a buffer, wherein the width of said buffer corresponds to the width of one digital sample;
 b. reading said digital samples in words, wherein said words correspond to columns of said buffer;
 c. storing said words in a frame memory;
 d. transferring the contents of said frame memory to the inputs of a data display;
 e. controlling said data display to display said data; and
 f. repeating steps a-e until said standardized video data stream is no longer available.

* * * * *